(12) United States Patent
Imai et al.

(10) Patent No.: US 12,111,622 B2
(45) Date of Patent: Oct. 8, 2024

(54) AUTONOMOUS NETWORK, CONTROLLER AND METHOD

(71) Applicant: RAKUTEN MOBILE, INC., Tokyo (JP)

(72) Inventors: Pierre Imai, Tokyo (JP); Paul Harvey, Tokyo (JP); Tareq Amin, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 385 days.

(21) Appl. No.: 17/597,028

(22) PCT Filed: Mar. 17, 2021

(86) PCT No.: PCT/JP2021/010757
§ 371 (c)(1),
(2) Date: Dec. 22, 2021

(87) PCT Pub. No.: WO2021/210329
PCT Pub. Date: Oct. 21, 2021

(65) Prior Publication Data
US 2023/0152761 A1    May 18, 2023

Related U.S. Application Data

(60) Provisional application No. 63/010,660, filed on Apr. 15, 2020.

(51) Int. Cl.
*G05B 15/02*    (2006.01)
(52) U.S. Cl.
CPC .................................... *G05B 15/02* (2013.01)
(58) Field of Classification Search
CPC ............................. G05B 15/02; G06F 9/4411
(Continued)

(56) References Cited

U.S. PATENT DOCUMENTS 8,521,359 B1    8/2013    Trytten et al.
8,799,537 B1 *  8/2014    Zhu ....................... G06F 13/385
                                                             710/14
(Continued)

FOREIGN PATENT DOCUMENTS

JP    200711507 A    1/2007
JP    201020539 A    1/2010

OTHER PUBLICATIONS

International Search Report in PCT Application No. PCT/JP2021/010757, mailed Jun. 22, 2021, 8pp.
(Continued)

*Primary Examiner* — Jigneshkumar C Patel
(74) *Attorney, Agent, or Firm* — HAUPTMAN HAM, LLP

(57) ABSTRACT

A controller for an autonomous network includes a processor configured to execute composable and replaceable modules in an interconnected manner to configure controller components. The controller components comprise a sensing component configured to collect sensor data about at least one controlled element under control of the controller, an analyzing component configured to process the collected sensor data to derive a current state of the at least one controlled element, a deciding component configured to, based on the derived current state, decide an action to be made with respect to the at least one controlled element, and an acting component configured to carry out the decided action with respect to the at least one controlled element, by causing a change in at least one of an operation of the at least one controlled element, or a configuration of the at least one controlled element.

17 Claims, 8 Drawing Sheets

(58) Field of Classification Search
USPC .......................................................... 700/28
See application file for complete search history.

(56) References Cited

U.S. PATENT DOCUMENTS

| | | | |
|---|---|---|---|
| 2005/0026486 A1* | 2/2005 | Thomas ................ | G06F 9/4415 439/188 |
| 2005/0114234 A1* | 5/2005 | Thomas ............... | G06Q 10/087 705/28 |
| 2012/0034978 A1* | 2/2012 | Lim ...................... | A63F 13/335 463/36 |
| 2013/0066470 A1* | 3/2013 | Wang .................. | H04L 12/2834 700/275 |

OTHER PUBLICATIONS

Pierre Imai et al., "Practical Online Network Stack Evolution", Self-Adaptive and Self-Organizing Systems Workshop (SASOW), 2010 Fourth IEEE International Conference On IEEE, Sep. 27, 2010, pp. 34-41, XP031929828, 8pp.

* cited by examiner

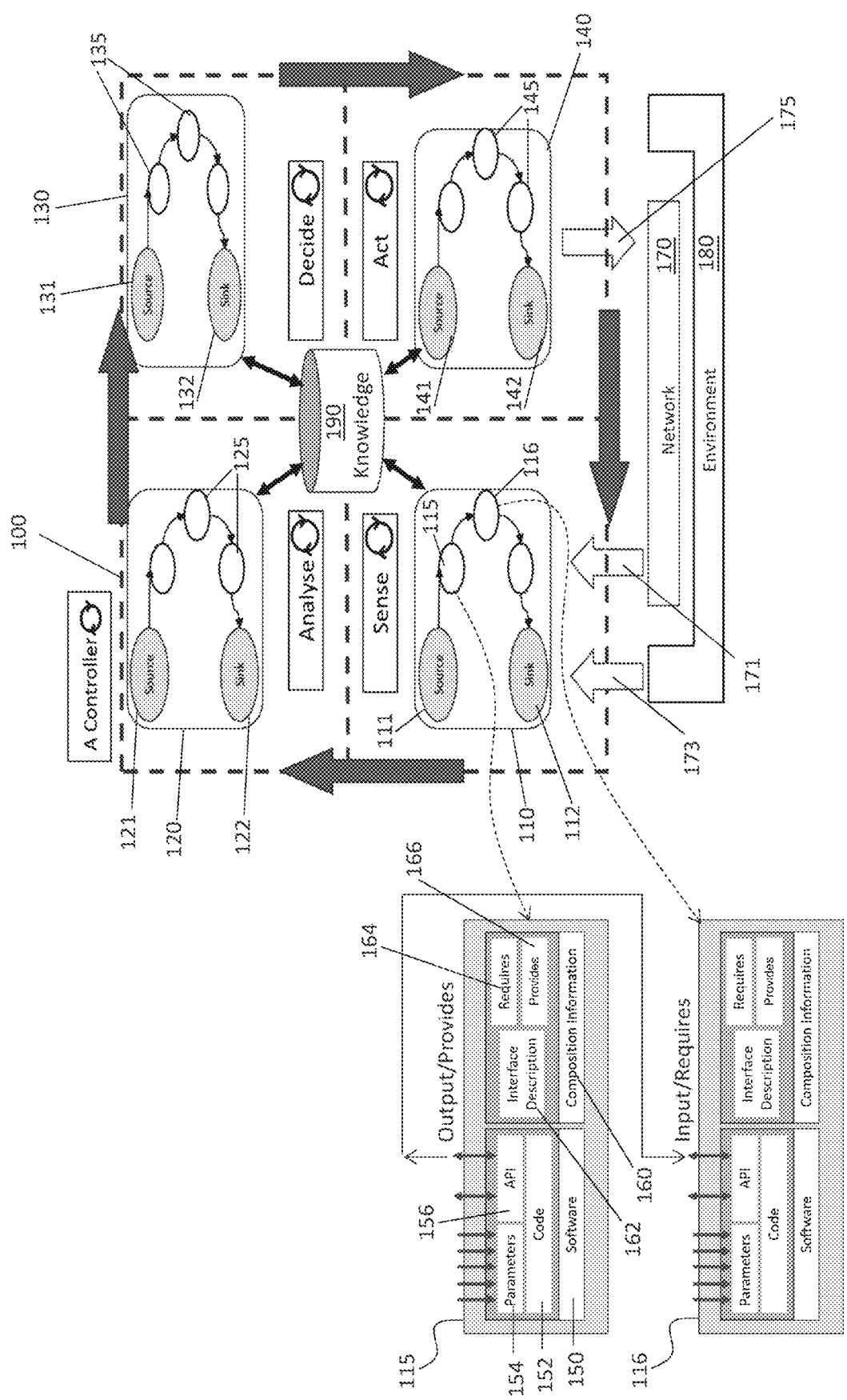
[Fig. 1]

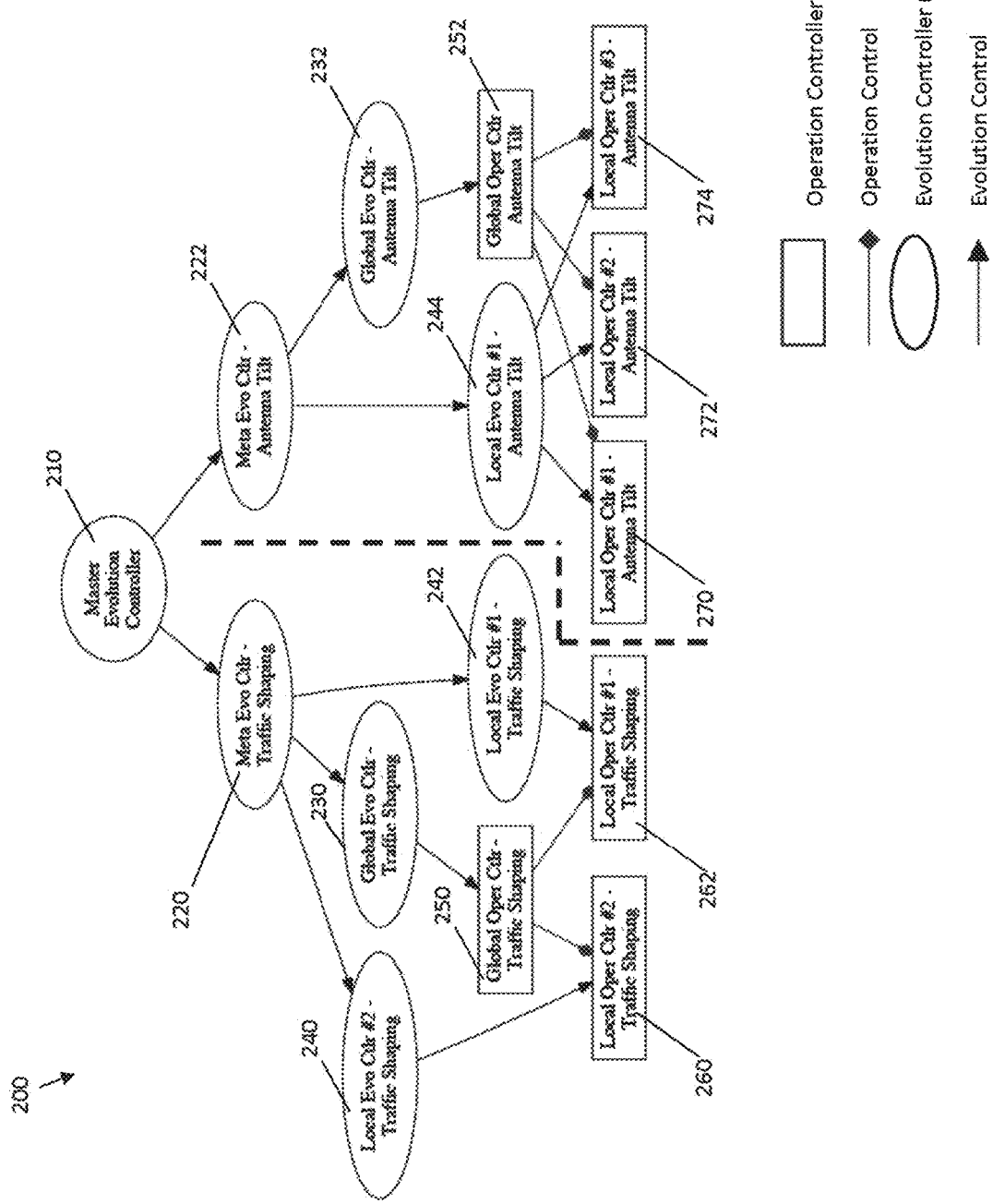

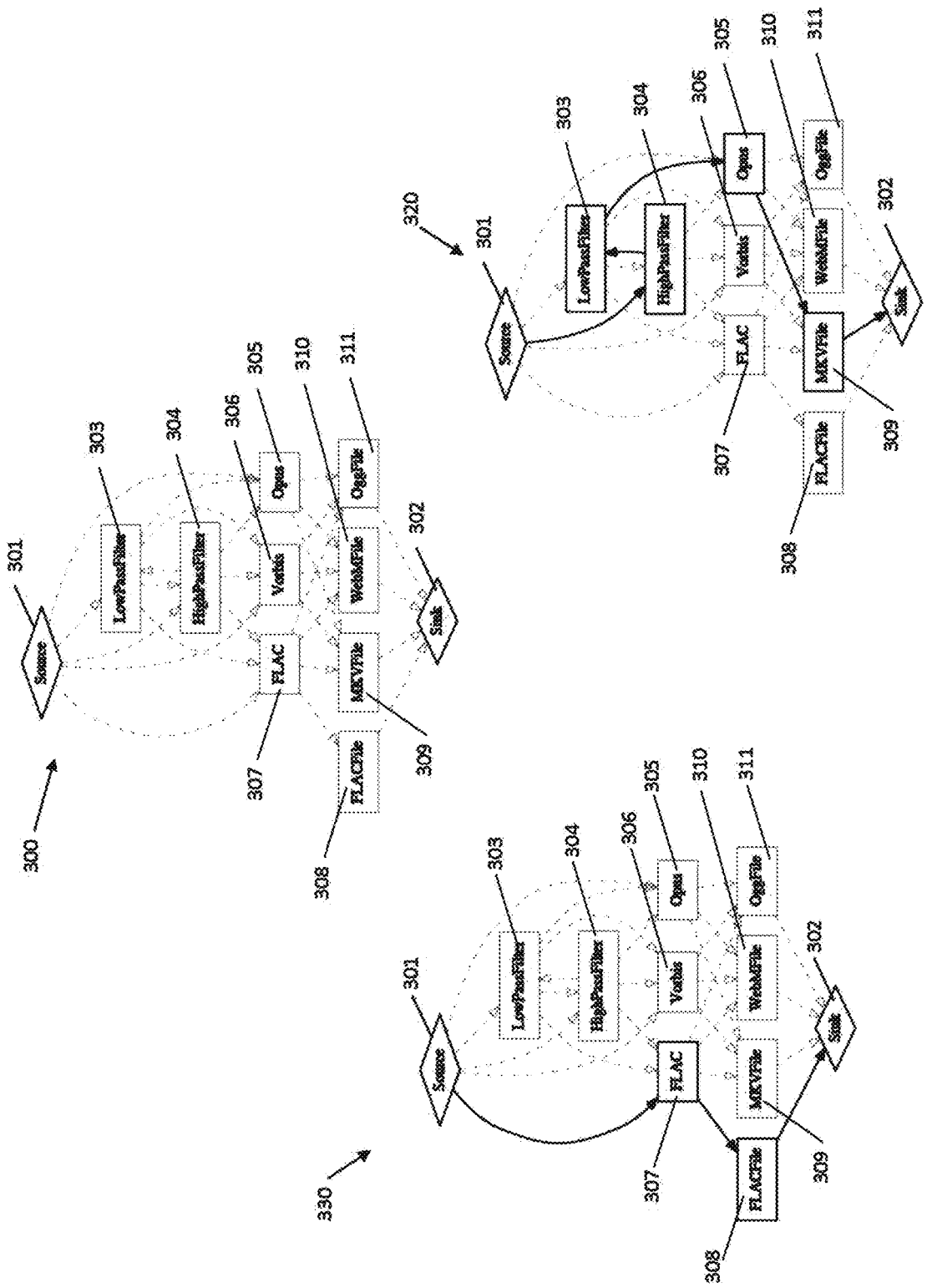
[Fig. 3]

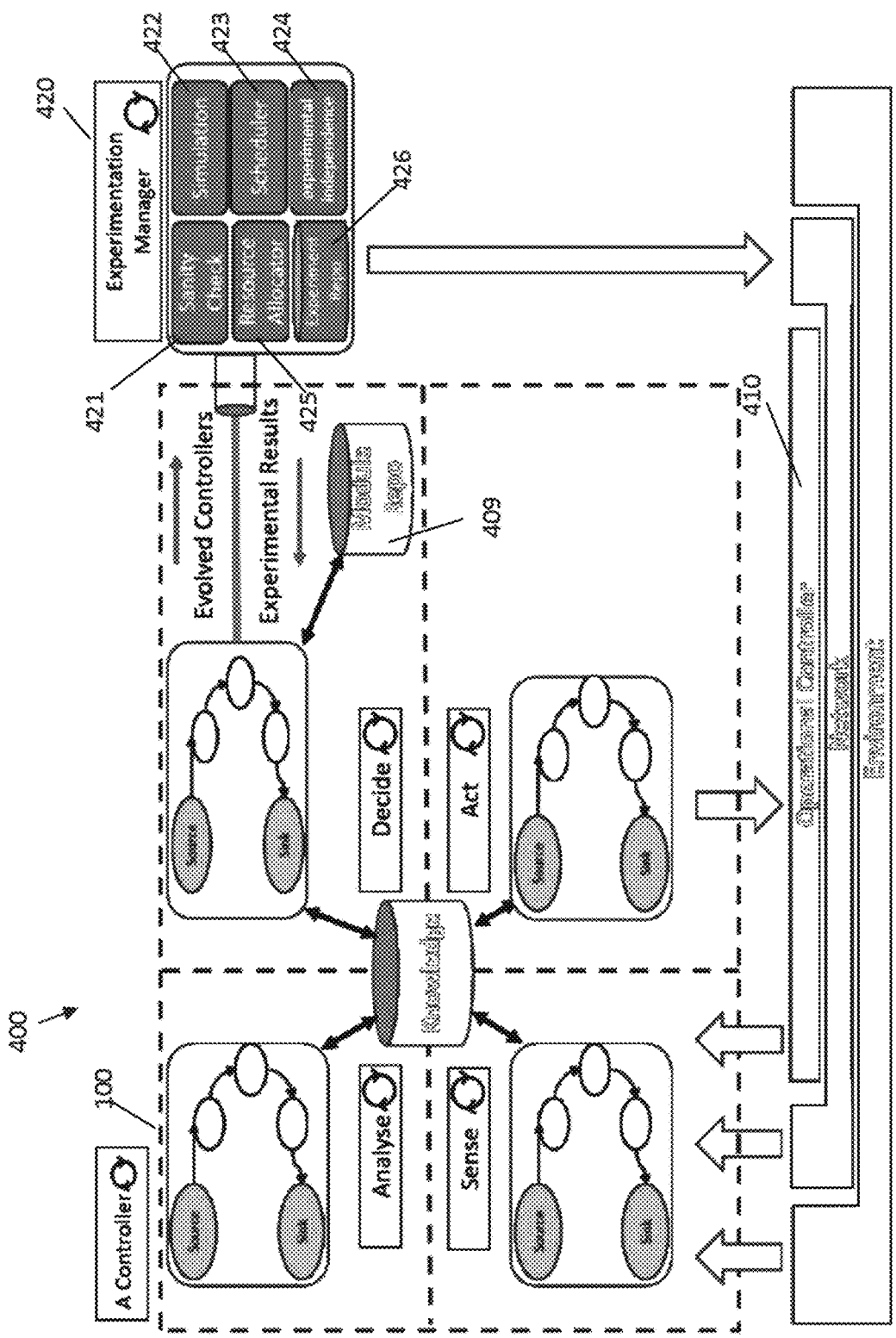
[Fig. 4]

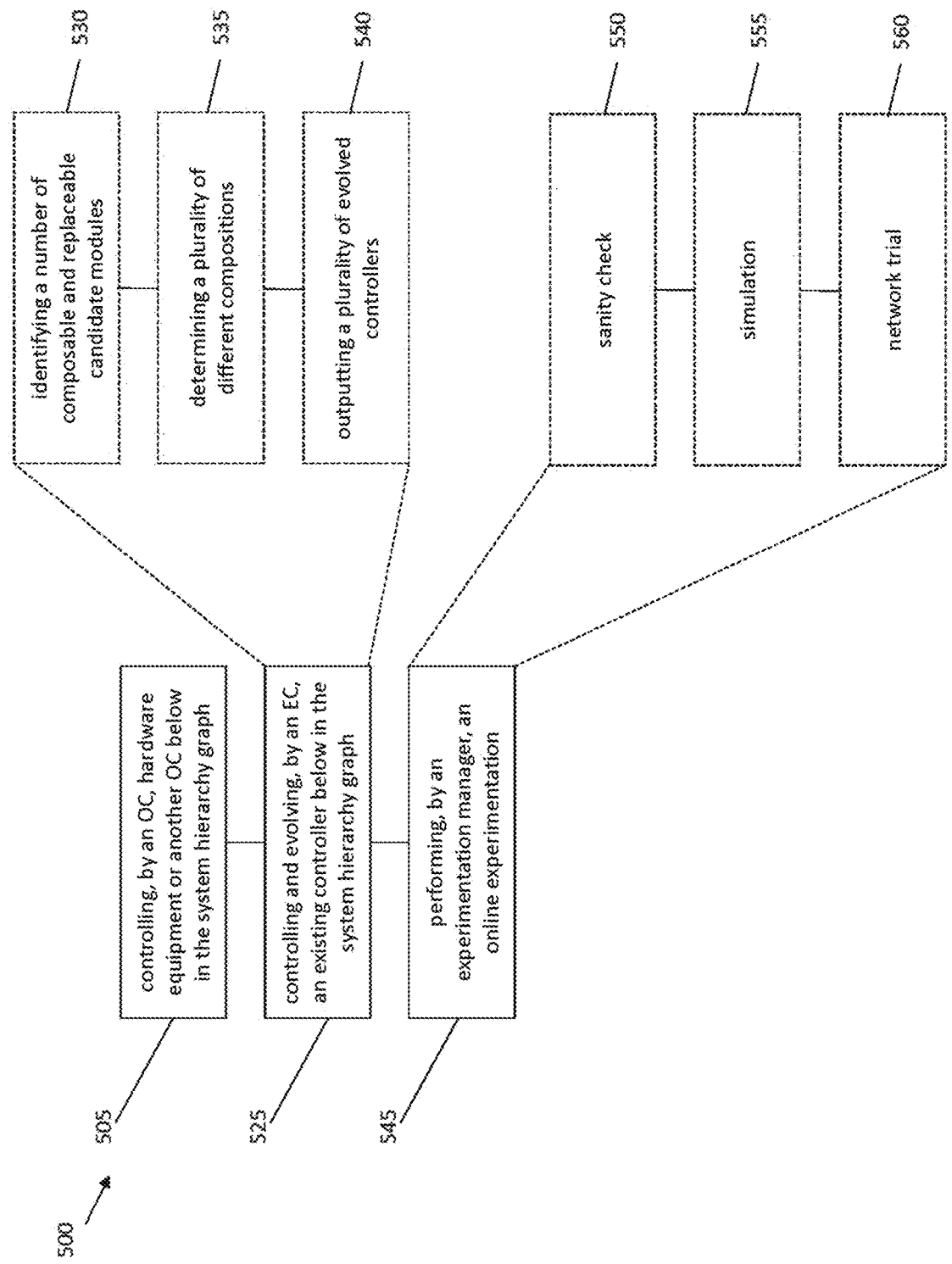

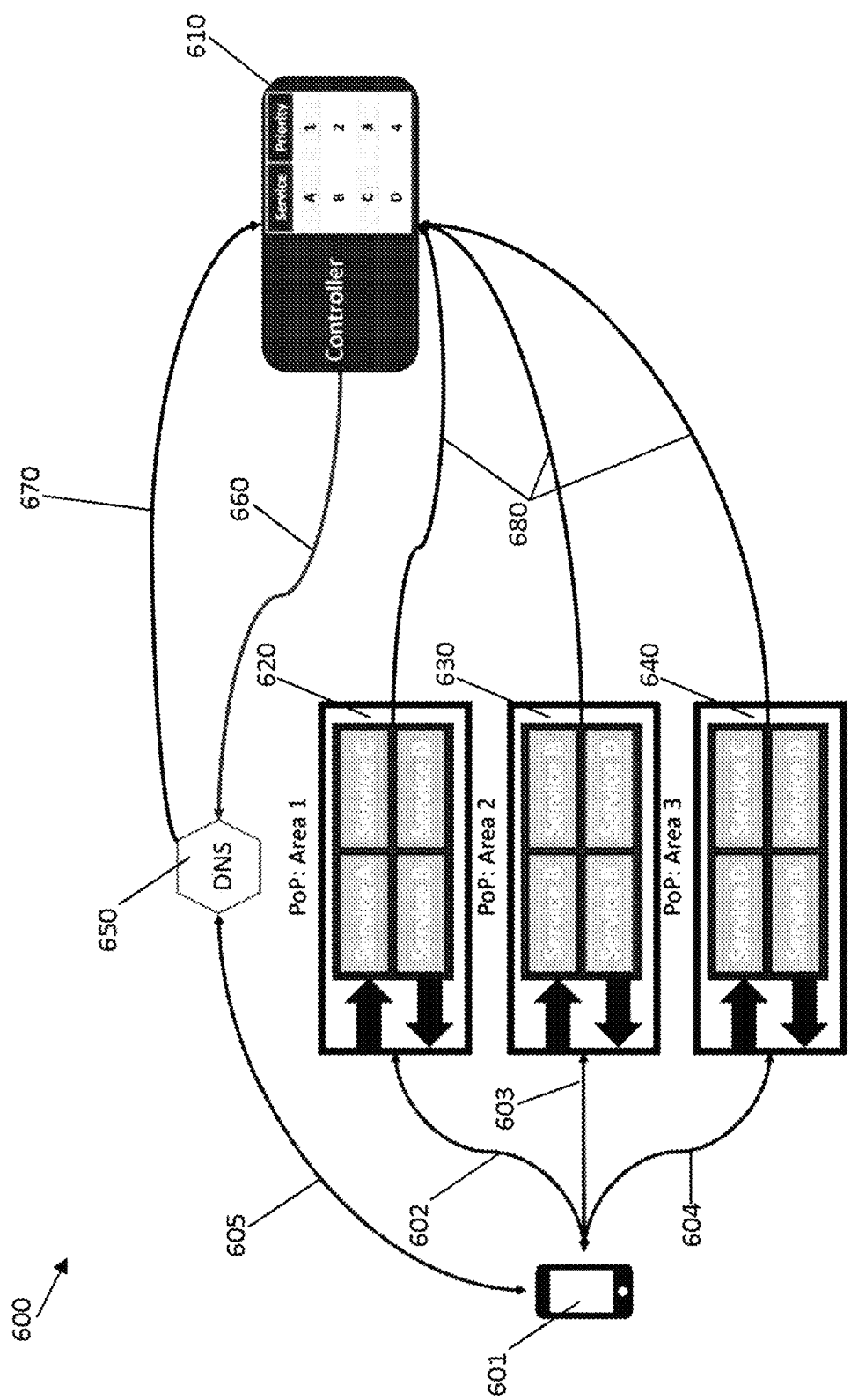

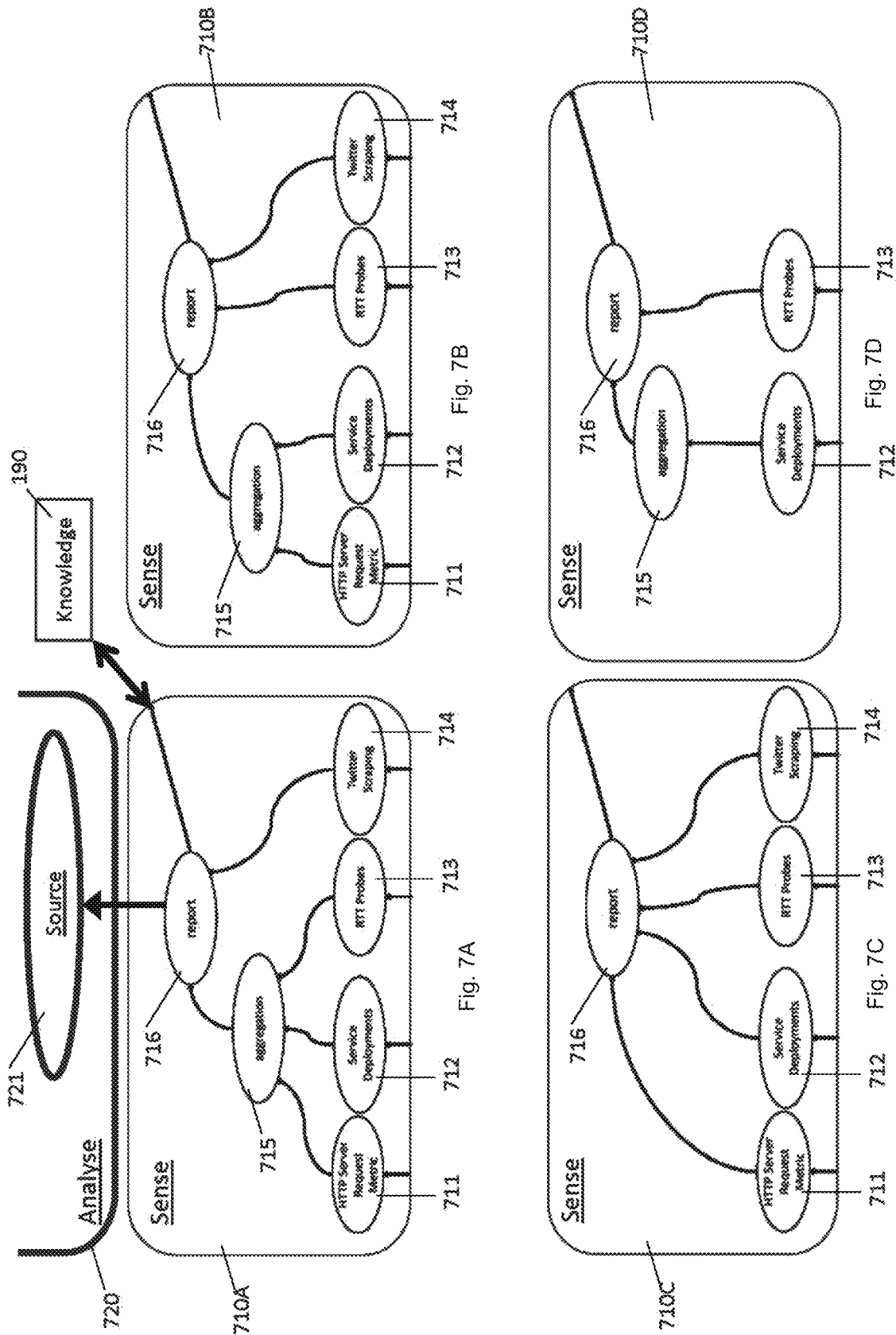

[Fig. 8]
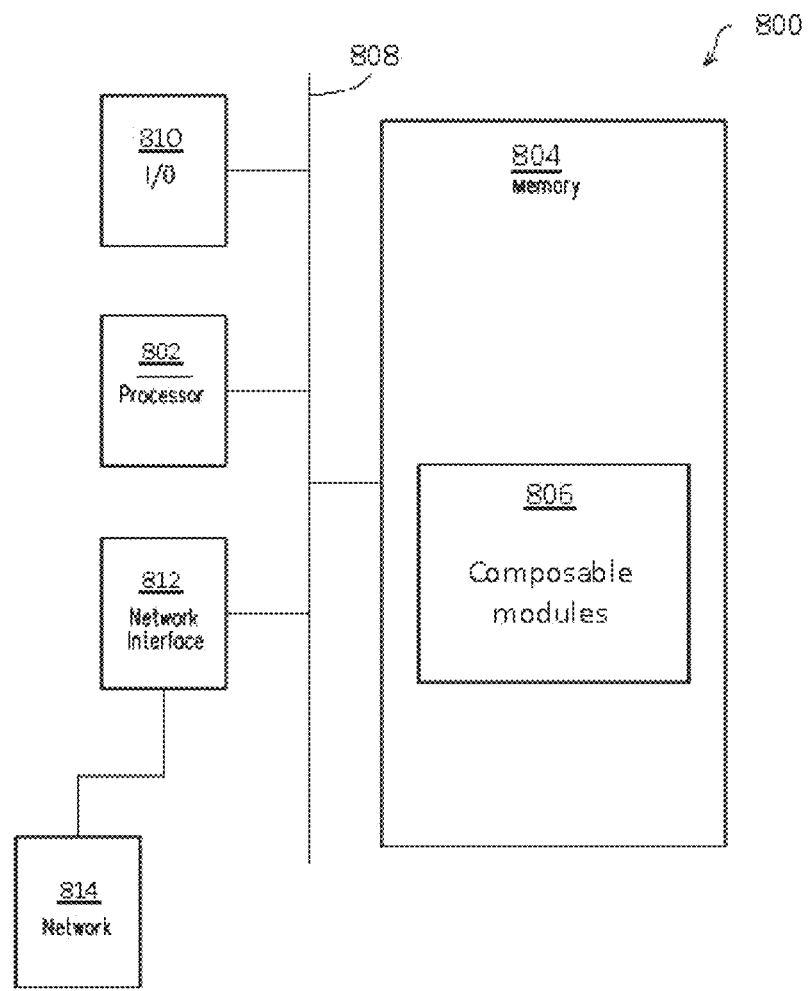

AUTONOMOUS NETWORK, CONTROLLER AND METHOD

RELATED APPLICATIONS

This application is a National Stage of PCT international application No. PCT/JP2021/010757 filed on Mar. 17, 2021, which claims priority to U.S. provisional application No. 63/010,660 filed on Apr. 15, 2020.

BACKGROUND

Networking and communication systems have enormous impacts on everyday lives. This influence is expected to grow in the near future, thanks to the expected proliferation of automotive, wearable, and other Internet-of-Things (IOT)-related applications. This massive transformation depends on advanced communication networks which will grow and become more complex for understanding and/or management.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1 is a schematic block diagram of a controller for an autonomous network, in accordance with some embodiments.

FIG. 2 is a schematic block diagram of a section of an autonomous network, in accordance with some embodiments.

FIG. 3 includes several schematic block diagrams of a part of a controller being evolved in a controller evolution, in accordance with some embodiments.

FIG. 4 is a schematic block diagram of a part of an autonomous network in an online experimentation for controller evolution, in accordance with some embodiments.

FIG. 5 is a flow chart of a method in an autonomous network, in accordance with some embodiments.

FIG. 6 is a schematic block diagram of a traffic load balancing section of an autonomous network for CDNs, in accordance with some embodiments.

FIGS. 7A-7D are schematic block diagrams of various compositions of a sensing component, in accordance with some embodiments.

FIG. 8 is a schematic block diagram of an example computer hardware configuration, in accordance with some embodiments.

DETAILED DESCRIPTIONS

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

An approach to address emerging issues related to an increasingly growing and/or complex communication network is to make the network autonomous. An autonomous network is configured to cope with and adapt to unforeseen events, and/or to improve and adapt itself to meet challenges of the future, for example, by integrating new technologies as they become available, with little or even no human intervention.

Some embodiments make it possible to achieve an autonomous network by configuring controllers from composable and replaceable modules, interconnecting controllers in a system hierarchy graph in which a controller at a higher level is configured to control and/or evolve a controller at a lower level, and performing online experimentation to evaluate evolved controllers. In at least one embodiment, composable and replaceable modules facilitate controller modification, optimization or evolution, e.g., by replacing one or more existing modules with different equivalent modules and/or different instances of the existing modules. In one or more embodiments, controller optimization/evolution and/or online experimentation are configured to be performed at runtime, permitting the autonomous network to address emerging issues and/or to adapt to new technologies. Other advantages of various embodiments are also described herein.

FIG. 1 is a schematic block diagram of a controller 100 for an autonomous network, in accordance with some embodiments.

The controller 100 comprises a plurality of interconnected controller components, (also referred to as phases or stages). In the example configuration in FIG. 1, the plurality of controller components comprises a sensing component 110, an analyzing component 120, a deciding component 130, and an acting component 140. Each of the controller component comprises a plurality of interconnected modules. For example, the sensing component 110 comprises a source module 111, a sink module 112, and one or more intermediate modules 115, 116 connected between the source module 111 and the sink module 112. Similarly, the analyzing component 120, deciding component 130 and acting component 140 comprise respective source modules 121, 131, 141, respective sink modules 122, 132, 142, and intermediate modules 125, 135, 145 between the respective source modules and sink modules. In at least one embodiment, it is possible that a sink module of a controller component is directly connected to the source module of the same controller component. The controller components 110, 120, 130, 140 are interconnected into a loop, as indicated by the arrows between the controller components in FIG. 1, such that a sink module of a previous controller component in the loop is connected to a source module of a subsequent controller component, so that the source module of the subsequent controller component (i.e., the next phase) is given access to the output from the sink module of the previous controller component (i.e., the previous phase). A detailed description of requirements for each controller component (i.e., each phase) is provided by a controller specification (described herein), in conjunction with additional requirements derived from the modules present within this next phase. For example, the sink module 112 of the sensing component 110 is connected to the source module 121 of the analyzing component 120, the sink module 122 of the analyzing component 120 is connected to the source module 131 of the deciding component 130, the sink module 132 of the deciding component 130 is connected to the source module 141 of the acting component 140, and the sink module 142 of the acting component 140 is connected to the source module 111 of the sensing component 110. In at least one embodiment, the loop of the controller components is a cognitive control loop, as described herein. The number and/or manner of how various modules are interconnected in each controller component 110, 120, 130, 140 in FIG. 1 are examples. Other arrangements are within the scopes of various embodiments, for example, as described with respect to FIG. 3.

The controller 100 comprises at least one memory (not shown in FIG. 1) and at least one processor (not shown in FIG. 1) coupled to the at least one memory, for example, as described with respect to a computer hardware configuration in FIG. 10. In at least one embodiment, one or more other components of the computer hardware configuration are also included in the controller 100. The described modules 111, 112, 115, 116, 121, 122, 125, 131, 132, 135, 141, 142, 145, which are interconnected into each of the controller components 110, 120, 130, 140, or into the whole controller 100, are composable and replaceable modules contained in the at least one memory of the controller 100. The controller components 110, 120, 130, 140 are configured by the at least one processor of the controller 100 when the at least one processor executes the modules in an interconnected manner. For example, in at least one embodiment, the modules 111, 115, 116, 112 are interconnected at runtime by the at least one processor executing the modules to configure the sensing component 110, in a manner similar to dynamic link libraries (DLLs) are interconnected at runtime. In at least one embodiment, the modules are interconnected at load time. In at least one embodiment, several controller components of the controller 100, or the whole controller 100, is/are implemented by a processor. In further embodiments, at least one controller component of the controller 100 is implemented by several processors connected or distributed over a network.

As noted above, the modules constituting the controller components of the controller 100 are composable and replaceable modules, which are configured to be selected and interconnected in various combinations to satisfy specific requirements. Such modules are further replaceable making it possible in at least one embodiment to modify or evolve the controller 100 with ease. An example configuration of composable and replaceable modules is given with respect to the module 115 of the sensing component 110 in the controller 100.

A composable and replaceable module, such as the module 115, comprises a software section 150 and corresponding composition information 160.

The software section 150 represents an operational logic of the module 115, and comprises one or more executable codes 152, one or more parameters 154, and an application programming interface (API) 156. The executable codes 152 represent a logical operation of the module 115 and the at least one processor of the controller 100 executes the executable codes 152 to perform the logical operation of the module 115. The parameters 154 are used by the at least one processor of the controller 100 to initialize and/or to configure the logical operation of the executable codes 152, for example, how long to wait before a timeout. The API 156 enables the module 115 to be interacted with. In at least one embodiment, the API 156 comprises a unique ID (UID) which uniquely identifying the module 115 from other modules, and one or more dependencies that specify the functionality corresponding to the logical operation of the executable codes 152.

The composition information 160 comprises meta information including an interface description 162, an input description 164 of capabilities the module 115 requires, and an output description 166 of capabilities the module 115 provides. In at least one embodiment, the purpose of the composition information 160 is to ensure the functionally correct composition of modules.

The described configuration for a composable and replaceable module is an example. Other configurations for composable and replaceable modules are within the scopes of various embodiments. In at least one embodiment, the configuration of a composable and replaceable module requires no particular technology choice in either the software used, the overall operational purpose, or the scope of the module. This is equivalent to the concept of deciding the size and scope of a software module in an application. In at least one embodiment, one or more composable and replaceable modules constituting the controller 100 are user provided. In some embodiments, one or more composable and replaceable modules constituting the controller 100 are auto-generated or software-generated.

In some embodiments, modules depend on the presence and/or description of APIs, such as API 156, provided by other modules to connect with, or replace, each other. The APIs make it possible to programmatically or automatically compose modules together to create a controller component or the whole controller. In an example, the same API is provided by multiple different modules. For example, an audio codec with a sound encoding functionality provides an Encode API with an optional tag lossless corresponding to, e.g., a lossless Free Lossless Audio Codec (FLAC) module, or with an optional tag lossy corresponding to, e.g., a lossy MP3 module. The optional tags indicate whether decoding the encoded output would return the bit-wise identical input data or not. In some embodiments, a globally-unique API identifier combined with optional tags constitute a "contract" for composability and interoparability, and therefore, guarantee that a module which requires a certain API will be able to utilize any module with the same given API. Modules having the same API are replaceable or interchangeable with each other. In a further example, the same module has different instances corresponding to different parameters, such as parameters 154, input to the module. Such differently parameterized instances of the same module are also replaceable or interchangeable. In at least one embodiment, one or more dependencies exposed through the API of one module define conditions or requirements that need to be provided by another target module, to which this module will be connected. In programming terms, such a connection is, for example, represented by a pointer to an object which provides the necessary API, or by a remote procedure call (RPC) function on a remote host. In the example configuration in FIG. 1, a module 116 is connectable to a downstream of the module 115 when a dependency defining an input (Requires) in the API of the module 116 matches a dependency defining an output (Provides) in the API 156 of the module 115.

A further specific example is given in below with respect to three composable and replaceable modules having the following descriptions which are exposed via the respective APIs of the three modules:

---

Module LowPassFilter:

Provides: Codec, Filter;
Requires: Codec;
Parameters: 0 . . . 9, 1 . . . 100, {5, 7, 9};
Module HighPassFilter:

Provides: Codec, Filter;
Requires: Codec;
Parameters: 1 . . . 100, 1 . . . 10;
Module FLAC:

Provides: Codec(lossless), FLACCodec(lossless);
Requires: FLACFile;

---

As indicated above, by specifying the capabilities, configurable parameters, and the interface of each module using a description language, it is possible to uniquely identify each of the above three modules by a unique identification, i.e., LowPassFilter, HighPassFilter, and FLAC, respectively. The remainder of the description of each module defines the capabilities that this module provides, its requirements, and the acceptable ranges of its configuration parameters. The acceptable ranges describe the range of values that each configuration parameter can take, and/or a set of possible parameter values. For example, the module LowPassFilter provides Codec and Filter, requires Codec, and accepts configuration parameters in the range of 0 . . . 9, 1 . . . 100, {5, 7, 9}. The module LowPassFilter is connectable to a downstream of the module HighPassFilter (as described with respect to FIG. 3) because a dependency (Codec) defining an input (Requires) of the module LowPassFilter matches a dependency (also Codec) defining an output (Provides) of the module HighPassFilter.

In at least one embodiment, having each module provide a standard description, such as composition information 160, enables equivalent but different modules, or module instances, to be interchanged programmatically. For example, a compression module configured for a web server is reusable in a logging system so long as the module descriptions are compatible. This module reuse is an advantage in at least one embodiment.

In some embodiments, in the context of the sensing component 110 which receives sensor data as described herein, descriptions of sensors that provide sensor data to the sensing component 110 are provided so that the sensing component 110 understands the sensors involved or sensor data provided. There are two types of description for sensors. The first type of sensor description is similar to the module description discussed above and concerns the symbolic description of sensors, such as thermistor, packet probe, energy meter, as well as the data types that they produce, e.g., degrees centigrade, packet loss, joules. A sensor developer provides this information via a specification. One or more embodiments support a taxonomy of sensor types and data while other sensor networks and/or IoT efforts make it possible to classify both sensor types and data by problem domain to better exploit the right tool for the right job. By describing sensors using standard descriptions similar to those of modules, one or more of the following advantages is/are achieved in at least one embodiment: sensors from one domain is reusable in another domain, equivalent but different sensors are interchangeable, classification can guide the process of "good" module composition, classification can help automate the process of sensor data aggregation and later reuse of this aggregation between similar sensors classes. A second description type concerns the inference of meaning from the raw sensor data. In this case, the use of taxonomies combined with ontologies will enable these relationships to be inferred.

In the example configuration in FIG. 1, the controller components 110, 120, 130, 140 are interconnected into a loop which, in some embodiments, is a cognitive control loop, also referred to as autonomic control loop or cognitive cycle, or the like. In such a cognitive control loop, the sensing component 110 is configured to collect sensor data about at least one controlled element under control of the controller 100. The analyzing component 120 is configured to process the collected sensor data to derive a current state of the at least one controlled element. The deciding component 130 is configured to, based on the derived current state, decide an action to be made with respect to the at least one controlled element. The acting component 140 is configured to carry out, in real-word, the decided action with respect to the at least one controlled element. The action comprises a change in an operation or a configuration of the at least one controlled element.

In at least one embodiment, the cognitive loop is a consideration to achieve autonomy. The cognitive control loop is performed by the controller 100 to control, evaluate or optimize an operation or configuration of the controlled element which includes a hardware equipment, another controller in the autonomous network, or a section or domain of the autonomous network, as described herein. In at least one embodiment, the size and scope of this control or optimization task of the controller 100 is defined by a user. In some embodiments, the cognitive control loop comprises machine learning, such as q-learning, supervised learning, semi-supervised learning, unsupervised learning, deep learning, deep reinforcement learning, or the like. In some embodiments, the at least one memory of the controller 100 further contains a knowledge base 190 accessible by at least one of the controller components 110, 120, 130, 140, and containing history of previous choices and corresponding consequences for used in machine learning or optimization. In at least one embodiment, the knowledge base 190 is shared among multiple controllers of an autonomous network described herein, and is stored in one or more memories as described herein.

In one example, the controlled element under control of the controller 100 comprises hardware equipment coupled to the controller 100 via a network 170. In the context of a telecommunication network, examples of hardware equipment controllable by the controller 100 include, but are not limited to, base station, antenna, transceiver circuitry, contents storage, server, router, or the like. The sensor data 171 received by the sensing component 110 via the source module 111 include data about an operation of the hardware equipment including, but not limited to, antenna direction, transmitting power, allocable or used resources, beam shape, traffic, number of requests, available storage, or the like. In at least one embodiment, the sensing component 110 of the controller 100 is further configured to receive sensor data 173 about an environment 180 in which the hardware equipment and/or the controller 100 is operated, such as temperature. Although the term "sensor data" is used to describe information fed to the sensing component 110, it is not necessary that all such information is collected by using a sensor. For example, certain information about the operation of the hardware equipment, e.g., transmitting power or antenna tilt, is available or inferable from a control command at the hardware equipment, without requiring a sensor to collect. For another example, sensor data include data retrieved via a module of the sensing component 110 which is accessing historical data in a network information database, such as the knowledge base 190. In the description herein, "sensor data" also referred to as "telemetry."

The analyzing component 120 analyzes the sensor data collected by the sensing component 110 to determine whether the operation of the hardware equipment meets a predetermined standard, e.g., a predetermined level of quality of service. In response to a determination by the analyzing component 120 that the predetermined standard is not met by the current operation of the hardware equipment, the deciding component 130 decides an action to be taken to improve the current operation of the hardware equipment, e.g., by adjusting a tilt angle of an antenna. The acting component 140 then carries out the action decided by the deciding component 130, e.g., by sending a command 175 to the hardware equipment, instructing the hardware equipment to adjust the antenna tilt angle. In some embodiments, the acting component 140 also sends information about the carried action to the sensing component 110 for use in a next control iteration, thereby completing the cognitive control loop.

If the operation of the hardware equipment is not improved or optimized after a number of control iteration, which is reflected, for example, though the history in the knowledge base 190, the deciding component 130 decides to replace the hardware equipment and the acting component 140 issues command for carrying out the replacement. For example, the acting component 140 instructs a base station to use another antenna instead of the current antenna, or to send a request to a maintenance center requesting replacement of the current antenna.

In a further example, the controlled element under control of the controller 100 comprises another controller in an autonomous network as described herein. A cognitive control loop is performed by the controller 100 in at least one embodiment to control, optimize, or evaluate an operation or configuration of the other controller under control. When the deciding component 130 decides that a corrective action is to be carried out, the acting component 140 instructs or causes the other controller under control to change an operation or a configuration thereof. A change in the operation of the other controller under control results, in at least one embodiment, in a change in operation of hardware equipment directly or indirectly controlled by the other controller. A change in a configuration of the other controller under control is effected, in at least one embodiment, by changing the composition of modules or a controller graph in which the modules are interconnected in the other controller under control, for example, as in a controller evolution described herein.

In some embodiments, each controller element 110, 120, 130, 140 operates on an independent time scale from the others. For example, sensing by the sensing component 110 is a continuous process, whereas analyzing by the analyzing component 120 is operated from time to time to interpret the collected data. Decisions by the deciding component 130 are either periodic or triggered by changes or events in the environment and/or at the controlled element, and actions by the acting component 140 are in response to decisions.

As note herein, each controller element is a composition of modules interconnected in accordance with a controller graph. Examples of various compositions and/or graphs for implementing the same controller component are given with respect to FIG. 3. The controller 100 is visualized as one directed graph (controller graph) for each controller component in the cognitive loop. Each node in this controller graph represents one module instance. The root of this controller graph is the sink module (e.g., 112, 122, 132, 142) which depends on the required inputs of the next controller component in the cognitive loop. A purpose of the sink module (e.g., 112, 122, 132, 142) is to ensure that the respective controller component (e.g., 110, 120, 130, 140) delivers everything that is needed for the next controller component (e.g., 120, 130, 140, 110) of the controller 100. In at least one embodiment, at least one sink module (e.g., 112, 122, 132, 142) is a mirror image of the corresponding source module (e.g., 121, 131, 141, 111).

As described herein, modules possess an arbitrary number of dependencies, i.e., the APIs it utilizes as defined in the module description, and the vertices in the controller graph represent these dependencies. The structure of the controller graph, however, is not fixed. Since the dependencies of each module instance (node) guide the structure of a subgraph starting in that node, arbitrarily complex graphs are possible.

It is the manipulation by means of creation from scratch, re-arrangement, replacement, and configuration changes of compositions of a controller that enables some embodiments to adapt to both new and evolving situations. While in the example configuration in FIG. 1, the controller 100 is described as including four interconnected controller components which embody the sense, analyze, decide and act stages, respectively, it is possible in at least one embodiment to implement the controller 100 as a single composition. However, the configuration of four controller components as described both simplifies (human and machine) comprehension and reduces the state space of potential module configurations. In at least one embodiment, the user provides a metric for how to measure the fitness or utility of a controller by means of a utility function. A specific utility function is given below as an example with respect to FIG. 6. Other utility functions and/or configurations with auto-generation of utility functions are not excluded. In at least one embodiment, a utility function of a controller is described in the controller specification or included in its software. In at least one embodiment, a utility function is included in at least one of the composable and replaceable modules constituting the controller.

Additionally, in some embodiments, all controller components share access to the persistent knowledge through the knowledge base 190. This arrangement facilitates understanding of previous choices and corresponding consequences, changing system states, and synchronization across distinct update periods. In at least one embodiment, the knowledge to be kept is dependent on the specific controller, is utilizable by separate controllers where applicable. In at least one embodiment, the knowledge storage is an eventually consistent distributed data storage.

FIG. 2 is a schematic block diagram of a section of an autonomous network 200, in accordance with some embodiments. The section of the autonomous network 200 in FIG. 2 is a control plane that comprises a plurality of controllers. The autonomous network 200 further comprises hardware equipment controlled by operation controllers among the controllers exemplarily illustrated in FIG. 2. For sake of simplicity, hardware equipment is not illustrated in FIG. 2. Examples of hardware equipment are described herein, and include, but are not limited to, base station, antenna, transceiver circuitry, contents storage, server, router, or the like. Further, the control plane in FIG. 2 is an example of specific use cases for traffic shaping and antenna tilt optimization.

Other arrangements of controllers and/or other use cases are within the scopes of various embodiments.

In at least one embodiment, each controller of the autonomous network 200 has a configuration as described with respect to FIG. 1. The plurality of controllers of the autonomous network 200 are interconnected in to a system hierarchy graph as exemplarily illustrated in FIG. 2. The illustrated system hierarchy graph is an example. Other system hierarchy graphs are within the scopes of various embodiments. The plurality of controllers of the autonomous network 200 comprises at least one operation controller (OC) and at least one evolution controller (EC). An OC is configured to control a change in an operation of at least one controlled element under the OC in the system hierarchy graph. For example, an OC is configured to control hardware equipment (not shown in FIG. 2) or another OC. An EC is configured to configured to control a configuration of at least one controlled element under the EC in the system hierarchy graph. For example, an EC is configured to control hardware equipment (not shown in FIG. 2) or another controller which is an EC or an OC.

In the example configuration in FIG. 2, the autonomous network 200 comprises ECs 210, 220, 222, 230, 232, 240, 242, 244, and OCs 250, 252, 260, 262, 272, 272, 274. The control performed by an EC is referred to as evolution control. The control performed by an OC is referred to as operation control. An OC directly controlling hardware equipment is referred to as Local OC. An OC controlling another OC is referred to as a Global OC. An EC controlling a Local OC is referred to as Local EC. An EC controlling a Global OC is referred to as Global EC. Global and Local ECs are controlled by Meta-ECs which, in turn, are controlled by Master EC 210 at the topmost level of the system hierarchy graph in FIG. 2.

In at least one embodiment, the system hierarchy graph exemplarily illustrated in FIG. 2 is flexible and includes runtime-defined hierarchies of controllers. As noted above, the controllers in the autonomous network 200 comprise two distinct types of controllers within the same hierarchy, one type, i.e., ECs, for enabling evolution, the other type, i.e., OCs, for operational tasks.

An EC is configured to decide when and how to evolve the controller(s) in a subgraph under the EC in the system hierarchy graph. Each EC is configured to define in the corresponding software section (similarly to 150 in FIG. 1) its own dependencies, i.e., each EC defines, either in software or directly in its corresponding controller description as described herein, what kind of controllers (EC or OC) and how many of them (how many OC, how many EC) it needs in the layer or subgraph directly below itself. This is implemented in at least one embodiment via a special API dependency exposed via the EC's API. This special API dependency returns the specification or composition for each of the controllers to be instantiated on the layer or subgraph directly below the current EC. For example, Global EC 230 is configured to decide when and how to evolve Global OC 250, and has a special API dependency that returns the specification for the Global OC 250 on the layer or subgraph directly below the Global EC 230. For another example Meta EC 220 is configured to decide when and how to evolve Global EC 230 as well as Local ECs 240, 242, and has one or more special API dependencies that return the specification for each of the Global EC 230 as well as Local ECs 240, 242 on the layer or subgraph directly below the Meta EC 220. In at least one embodiment, an EC is configured to have the freedom, exposed via a special API dependency at the API of the EC, to decide how to calculate its utility function based on the utility function(s) of its subordinates, i.e., one or more EC or OC in the subgraph directly under the EC. In at least one embodiment, an EC is configured to further have the liberty, exposed via a further special API dependency at the API of the EC, to decide when the subgraph below itself should change, i.e., when to add or remove subordinate controllers, and when to re-compose or re-configure the subordinate controllers. In at least one embodiment, an EC is, for example, configured to apply an independently evolved OC per data center, per region, or globally, compare the results, and decide which approach is most efficient, as measured by the utility function of the EC.

An OC, on the other hand, is configured to control network elements (hardware equipment) and other OCs. An OC is not configured to influence the system hierarchy graph of the autonomous network 200 or the evolution process of the autonomous network 200. An OC is controllable by both another OC and an EC. For example, a Local OC 262 is controlled, operation-wise, by Global OC 250, and configuration-wise by Local EC 242. In some embodiments, an EC controls the composition of the controllers below the EC (as well as the hierarchy branch, or subgraph, below the EC) and an OC directs the operation of the subordinate (underlying) OCs and/or controlled elements (e.g., hardware equipment).

In the example configuration in FIG. 2, the autonomous network 200 is configured to handle both traffic shaping and antenna tilt optimization. For the traffic shaping case, the Global OC 250 decides the high-level weight allocations per location, and two Local OCs 260, 262 shape the traffic while obeying the global weights. These OCs 250, 260, 262 are independently evolved by corresponding Local or Global OCs 230, 240, 242. For the antenna tilt case, all three Local OCs 270, 272, 274 are evolved by one Local EC 244 and controlled, operation-wise, by the Global OC 252. The Global OC 252 is being evolved by the Global OC 232. All Global and Local ECs of the traffic shaping and antenna tilt optimization cases, respectively, are evolved through corresponding Meta ECs 220, 222 which, in turn, are evolved by the Master EC 210.

In at least one embodiment, a purpose of creating a hierarchy of OCs is to separate local decisions, which might require fast reactions, from more deliberate global decisions which can be performed more slowly. For example, a single base station controller (a Local OC) is configured to quickly decide to adjust its antenna tilt based on the number and conditions of the connected devices; however, a Global OC can get feedback from many Local OCs and provide more general policy decisions at a larger temporal granularity. Higher and lower level OCs are configured to work together to solve some use case, e.g., through solving an optimization problem, or evolved by an EC to do so. Whether to use a dedicated controller to supervise underlying controllers (or hardware equipment) or to utilize a shared controller depends on various design factors, such as the specific application, controller configuration or composition, or evolution outcome. Embodiments described herein provide sufficient flexibility to accommodate various design factors.

Having a hierarchical ordering of ECs enables some embodiments to apply different evolution approaches depending on the task at hand and the operation environment, as often the optimal optimization or adaptation strategy depends on these. For example, the optimization strategy for an in-data center resource allocation might differ from the regional strategy (different time scale, explicit allocation to machines vs. weights per application group, etc.). The mapping of the Master C to underlying ECs follows a similar logic.

In some embodiments, one or more description languages described herein for describing modules and/or sensors is/are usable to describe controllers. The description language steers the functional composition and derivation of meaning from sensor data. Such a language provides a normalization layer that enables the system to programmatically understand and reason about the functional building blocks (e.g., modules and/or controllers) and sensors provided. Additionally, in at least one embodiment, the description language makes it possible to specify constraints for controllers and/or controller hierarchy branches (e.g., subgraph of controllers) and/or the corresponding utility functions, and thus to add one or more new or evolved controllers or hierarchies (e.g., subgraph of controllers).

In at least one embodiment, the constraints that guide which controllers are to be present in the autonomous network 200 for a particular use or function are also specified by means of a description language. As described herein with respect to FIG. 1, each controller comprises a plurality of controller components, or phases, such as sense, analyse, decide, and act phases. The connections between the controller components, or phases, is provided through the corresponding source and sink modules of each controller component, or phase.

Like modules, each controller in example embodiments also has a respective API, software (code) and one or more dependencies or requirements. The requirements are described in a description language and exposed via the API. An example of description language for describing constraints or requirements, which are applied to an OC and an EC for load balancing and exposed via the respective APIs of the OC and EC, is given below.

---

Controller LoadBalancer:

ReqOutputs:
Sense: LinkStats, MachineResourceStats, QueryStats, LBPerfStats;
Analyse: NetLoadPerSecond, MachineLoadPerSecond, QPS, QuerySuccessRatio, QueryLatencyScorePerSecond;
Decide: LinkWeights, Mach Weights;
Act: DNSWeightAssignments, MachJobAssignments;
Utility: Product(QPS, QuerySuccessRatio, QueryLatencyScore);

---

Controller LoadBalancerEvoCtlr:

ReqControllers: LoadBalancer(2);
ReqOutputs:
Sense: LoadBalancerStats(2), EnvironmentStats;
Analyse: ControllerUtility(2), EnvironmentSituation;
Decide: ControllerPlans(2):
Act: ControllerComposition(LoadBalancer(0)), ControllerComposition(LoadBalancer(1));
Utility: Avg(ControllerUtility(2));

---

In the above load balancing example, the OC has a unique identification LoadBalancer, and has a plurality of requirements ReqOutputs for each of sense, analyse, decide, and act phases. The requirements for the sense phase include link statistics LinkStats, machine resource statistics MachineResourceStats, query statistics QueryStats, and load balancing performance statistics LBPerfStats. The requirements for the analyse phase include net load per second NetLoadPerSecond, machine load per second MachineLoadPerSecond, queries per second QPS, query success ratio QuerySuccessRatio, and query latency score per second QueryLatencyScorePerSecond. The requirements for the decide phase include link weights Link Weights, and machine weights Mach Weights. The requirements for the act phase include Domain Name System (DNS) weight assignments DNSWeightAssignments, and machine job assignments MachJobAssignments. The utility function Utility of the OC is Product(QPS, QuerySuccessRatio, QueryLatencyScore), i.e., the product of QPS, QuerySuccessRatio and QueryLatencyScore. In at least one embodiment, the OC performs a cognitive loop to solve an optimization problem to optimize its utility function. If a value of the utility function is within a predetermined target range, the OC makes no adjustment to the controlled element(s), e.g., content servers and/or a DNS as described with respect to FIG. 6. However, if the value of the utility function is outside the predetermined target range, the OC causes changes in the operations of the controlled elements, e.g., by changing one or more of DNSWeightAssignments and MachJobAssignments, so that the value of the utility function falls in the predetermined target range.

Also in the above load balancing example, the EC is LoadBalancerEvoCtlr and is responsible for the evolution of two distinct load balancing OCs (underlying controllers) each of the type LoadBalancer described immediately above. The EC has a special API dependency or requirement ReqControllers which is expressed as LoadBalancer(2), and identifies the type of underlying controller, i.e., LoadBalancer, and the number of underlying controllers in each controller type, i.e., 2, in the layer or subgraph directly below the EC. The EC also has a plurality of requirements ReqOutputs for each of sense, analyse, decide, and act phases. The requirements for the sense phase include statistics of the underlying controllers LoadBalancerStats(2), and statistics of the environment EnvironmentStats which indicate whether the characteristics of the environment has changed. The requirements for the analyse phase include the utility functions of the two underlying controllers ControllerUtility(2), and EnvironmentSituation which indicates information extracted from the environmental statics, such as, whether the current temperature is hot or cold. The requirements for the decide phase include ControllerPlans (2) which indicates a particular un-instantiated controller. The requirements for the act phase include compositions of the underlying controllers LoadBalancer(0) and LoadBalancer(1), i.e., ControllerComposition(LoadBalancer(0)) and ControllerComposition(LoadBalancer(1)), respectively. As described herein, the composition of each underlying controller includes the number and types of modules as well as the manner (e.g., controller graph) in which the modules are interconnected to configure the controller. The utility function Utility of the EC is the average of the utility functions of the two underlying controllers and is expressed as Avg (ControllerUtility(2)). In at least one embodiment, the EC performs a cognitive loop to solve an optimization problem to optimize its utility function. If a value of the utility function is within a predetermined target range, the EC makes no adjustment to the underlying controllers, i.e., the OCs LoadBalancer. However, if the value of the utility function of the EC is outside the predetermined target range, the EC causes changes in the configuration, i.e., specification or composition of at least one of the underlying controllers so that the value of the utility function of the EC falls in the predetermined target range. In at least one embodiment, the EC seeks to optimize its utility function to generate an evolved or new controller.

In the above example, for each controller, the required outputs are specified explicitly, whereas the required inputs are derived directly from the requirements of a composition that provides the needed outputs. In at least one embodiment, these input requirements also lead to additional output requirements for a preceding phase. Further, although the utility function the EC uses to evaluate all underlying controllers is defined directly within the EC specification in the above example, it is possible that the EC'S utility function is defined in the software of the EC in at least one embodiment.

In at least one embodiment, an advantage of the autonomous network 200 is the ability to adapt not only the operation of the controlled network entities, but also to evolve itself. Specifically, as described with respect to FIG. 1, controllers in the autonomous network 200 are composed from available composable and replaceable modules by selecting either a new or existing instance of one composable and replaceable module that provides a dependency of one of the nodes (module instances) already in the controller graph, and "plug" (insert or add) the selected new or existing instance into the dependency "slot". This process continues until all dependencies of all modules in the controller are filled. In at least one embodiment, the last requirements "layer" in this controller graph is provided by a source module, which is considered as the mirror image of a sink module of a previous controller component, i.e., it provides all the data that the previous controller component in the cognitive loop has made available.

FIG. 3 includes several schematic block diagrams of a part of a controller being evolved in a controller evolution, in accordance with some embodiments. The controller being evolved is an EC or OC in the autonomous network 200. The controller performing this controller evolution is the EC controlling the controller being evolved. For example, the controller being evolve is the OC 260, and the controller performing this controller evolution is the EC 240.

In FIG. 3, a set of all potential valid controllers, that is all valid compositions of module instances, e.g., candidate modules 303-311, and their configurations, defines a search space 300 that is to be traversed by the EC 240 in the controller evolution process of OC 260. The search space or domain 300 of all valid compositions is represented by all possible paths (controller graphs) through all available modules from a source module 301 to a sink module 302 in FIG. 3. The EC 240 is configured to identify and utilize one or more or any possible solutions within the search domain 300 to instantiate a controller. As a result, two valid controller compositions 320 and 330 are obtained. The valid controller compositions 320 and 330 are different in compositions of interconnected modules and/or the controller graph in which the modules are interconnected. It should be noted that the valid controller composition 320 includes a connection between modules LowPassFilter and HighPassFilter based on corresponding dependency as described above. The two identified valid controller compositions 320, 330 are indicated as subsequently subject to an online experimentation, as described herein with respect to FIG. 4.

In at least one embodiment, the valid controller compositions 320 and 330 are identified based on the same utility function of the existing OC 260. As a result, the valid controller compositions 320 and 330 are candidates of an evolved controller of the OC 260. In further embodiments, the valid controller compositions 320 and 330 are identified based on a different utility function from the utility function of the existing OC 260. As a result, the valid controller compositions 320 and 330 are candidates of a new controller, because a different utility function indicates a different target (or objective) for performance or operation optimization. For example, the current utility function of the OC 260 is directed to optimize load balancing, whereas the different utility function is directed to optimize cost and resulting in a different, new controller. For simplicity, "evolved controller" and "new controller" are used interchangeably herein, unless specified otherwise.

In at least one embodiment, the EC 240 is configured to evaluate performance of the OC 260 in operation, and performance of the identified valid controller compositions 320, 330 in online experimentation by using the same utility function of the EC 240. Based on the evaluation by the EC 240, when one or more of the identified valid controller compositions 320, 330 is/are found to provide better performance (e.g., a higher value of the utility function of the EC 240) than the OC 260, the identified valid controller composition 320 or 330 with the better performance is included as a new controller in a controller repository for other ECs or other autonomous networks to use, and/or is used by the EC 240 instead of the OC 260.

In at least one embodiment, the EC 240 itself is controlled or evaluated by another EC, e.g., the Meta EC 220. For example, the Meta EC 220 evaluates, using its own utility function, how fast and/or accurately the EC 240 traverses the search space 300 to identify valid controller compositions, such as 320 and 330. In the example configuration in FIG. 3, the numbers of all possible paths (controller graphs) and all available modules are limited for illustrative purposes. In real world operations in some embodiments, the search space 300 is large and includes hundred or thousand, or more, possible paths and available modules. The EC 240 is configured to use a search algorithm to traverse such a large search space 300 to identify valid controller compositions. The search algorithm is included, for example, in a module among the composable and replaceable modules constituting the EC 240. When the Meta EC 220 determines, through its utility function, that the search time and/or accuracy of the search algorithm used by the EC 240 to traverse the search space 300 is/are unacceptable, the Meta EC 220 is configured to modify a configuration or composition of the EC 240, e.g., by changing the module with the current search algorithm with another module containing another search algorithm, and then re-evaluate performance of the evolved EC, e.g., through an online experimentation, as described herein. In at least one embodiment, due to the large size of the search space 300, there is a trade-off between the speed of the EC 240 traversing the search space 300 and the accuracy of the point (e.g., a valid controller composition) in the search space 300 that the EC 240 found. The Meta EC 220 is configured to solve an optimization problem to reach an optimal solution, i.e., an optimal configuration or composition of the EC 240 with which the EC 240 achieves both acceptable search time and accuracy while traversing the search space 300. The described control or evolution of an EC by another, higher-level EC is an example. Other configurations are within the scopes of various embodiments.

Besides controller evolution described herein with respect to FIG. 3, hierarchy evolution is another aspect of the autonomous network 200 in accordance with some embodiments. As opposed to controller evolution which involves changing composition of modules and a controller graph in which the modules are interconnected into a controller, a hierarchy evolution involves changing composition of controllers and a system hierarchy graph in which the controllers are interconnected into an evolved autonomous network.

In at least one embodiment, each EC is configured to define how the subgraph of controllers below the EC in the system hierarchy graph is composed at runtime. The composition of controllers in a system hierarchy graph is, therefore, an iterative process. The root of the system hierarchy graph, i.e., the Master EC 210, is instantiated first and queried about its intentions regarding the composition of the subgraph below it. The corresponding controller instance for the subgraph below the Master EC are then instantiated according to the requirements of the Master EC. The same process is then iteratively continued for all underlying ECs. As mentioned before, OCs do not have the liberty to choose their dependencies at runtime, instead, in at least one embodiment, the dependency graph of an OC is derived via an administrator-defined specification.

When an EC decides, as a result of the cognitive loop control, to change the composition of the subgraph it manages, then the above composition methodology is applied to that subgraph alone.

The set of all potentially valid system hierarchy graphs, or subgraphs, constitutes the search space to be traversed in the evolution process be a corresponding EC. In some situations, due to the excessive overhead incurred if all valid graphs were to be explored through instantiation, an iterative search process is employed in accordance with some embodiments. In at least one embodiment, full instantiation of each controller is not necessary to just decide the hierarchy, instead, only the module which provides the necessary API and its dependencies are instantiated.

FIG. 4 is a schematic block diagram of a part of an autonomous network 400 in an online experimentation for controller evolution, in accordance with some embodiments.

The autonomous network 400 corresponds to the autonomous network 200, with the addition of an experimentation manager 420. The experimentation manager 420 comprises at least one memory (not shown in FIG. 4) and at least one processor (not shown in FIG. 4) coupled to the at least one memory, for example, as described with respect to a computer hardware configuration in FIG. 10. In some embodiments, the experimentation manager 420 is an independent process from the controllers of autonomous network 400.

In the situation in FIG. 4, the controller 100 is an EC configured to evolve an OC 410. As described with respect to FIG. 2, one or more composable and replaceable modules for evolving the OC 410 are retrieved from a module repository 409. In some embodiments, the module repository 409 is stored in the at least one memory of the controller 100. In one or more embodiments, the module repository 409 is stored on a shared storage device accessible by one or more other controllers of the autonomous network 400. One or more composable and replaceable candidate modules suitable for evolving the OC 410 are read by the controller 100 from the module repository 409. Although FIG. 3 describes an example controller evolution where a full controller graph from a source module to a sink module is to be evolved, it is possible in one or more embodiments to evolve just a section, e.g., subgraph, of the controller graph of the OC 410. In at least one embodiment, the controller evolution involves replacing an existing module in the subgraph to be evolved of the OC 410 with a different instance of the same module, or with a different composable and replaceable module, and/or changing the subgraph or controller graph of the OC 410. The controller 100 use the candidate modules retrieved from the module repository 409 to build all possible paths for the controller graph or subgraph to be evolved, and to indicate one or more valid compositions as corresponding one or more evolved controllers, as described with respect to FIG. 3.

The evolved controller is next sent to the experimentation manager 420 for an online experimentation for evaluation. A reason for this online experimentation is that with the ability to evolve controllers programmatically, it is possible, in some embodiments, to automatically generate a large number of new or evolved controllers. To understand the utility or fitness as applied to some domain of control of these new or evolved controllers, an online experimentation is performed.

In at least one embodiment, the experimentation manager 420 is configured to perform the online experimentation as an online trial-and-error experimentation in a multi-layered approach to experimentation. First, the new or evolved controllers are subjected to a sanity check 421 to ensure that logical mistakes are not made. For example, a new or evolved controller that tries to use a light sensor module where no such sensor exists is a logical error. In at least one embodiment, the use of taxonomies and ontologies is used to assist in this sanity check 421.

Next, new or evolved controllers are tested in a simulation 422 to initially estimate their utility using a utility function, for example, as described herein. Several simulation tools are usable to serve as indicators of potential success or outright failure. Based on this information, the experiment manager 420 is configured to decide whether to move to a next stage where, finally, new or evolved controllers will be gradually tested within the real production network, for example, a real telecommunication network. For the network trials, the experimentation manager 420 is configured to limit the (physical and temporal) scope of the new or evolved controller under test, with gradual expansion based on the new or evolved controller's measured (or estimated) utility function.

While overseeing the experimental trials of a new or evolved controller, the experiment manager 420 is also configured to act as a coordinator for different concurrent experimentations. This is a consideration in situation where there will be multiple ECs or Master ECs requesting online experimentation of newly evolved controllers. Intuitively, it is not possible to run all online experiments concurrently due to risks of conflicts and false utility in case of experiments interfering. Additionally, there is also a risk of instability, interference in high-gain operations, priorities of tests, etc. A telecommunications network is a large interconnected system meaning that interference is inevitable, however, the experiment manager 420 is configured to seek to limit this, for example, by also acting as, or including, a scheduler 423, a resource allocator 425, and/or an enforcer of experimental independence 424.

In some embodiments, the enforcer of experimental independence 424 ensures that experiments are performed independently of each other, because a fair comparison of different controllers' performance depends on the controllers being evaluated in a situation that does not give an unjust advantage to one of them. In at least one embodiment, the enforcer of experimental independence 424 ensures that experiments are meaningful and representative of the actual operation environment. For example, in an experiment during which a messaging protocol running over transmission control protocol (TCP) is evaluated against another one which utilizes user datagram protocol (UDP), with the utility metric (utility function) being based on throughput, latency and reliability. As long as this experiment is performed over a reliable transport without packet loss or reordering, UDP will have an unfair advantage due to less overhead (no three-way handshake, smaller header size). However, once the transport becomes unreliable, be it through a change in the environment or another concurrent experiment affecting the transport layer, TCP's ability to ensure to retransmit and order incoming packets might put it into advantageous position. The enforcer of experimental independence 424 is configured to guarantee that an experimental setup regarding one controller does not have an effect on another experimental setup for another controller.

In an online experimentation, the new or evolved controller under test, its parameter configurations, utility functions, current experimental scope, and results are collected, and one or more of these information are stored in an experiment repository 426 of the experimentation manager 420, for later reference and/or learning. The results are used by either the experimentation manager 420 of the requesting EC, i.e., controller 100, to determine if the new or evolved controller under experimentation should replace the existing controller 410. Based on the provided information, it is possible for the controller 100 and/or the experimentation manager 420 to infer potential conflicts in experimentation.

FIG. 5 is a flow chart of a method 500 in an autonomous network, in accordance with some embodiments. In at least one embodiment, the method 500 is performed by the autonomous network 400 described with respect to FIG. 4.

At operation 505, an OC controls hardware equipment or another OC below in a system hierarchy graph of the autonomous network, as described with respect to FIG. 2.

At operation 525, an EC controls and evolves an existing controller below in the system hierarchy graph, as described with respect to FIG. 3. For example, at operation 530, a number of composable and replaceable candidate modules is identified, for example, as described with respect to modules 303-311 in FIG. 3. At operation 535, a plurality of different compositions in each of which various candidate modules are interconnected to complete a section of a controller graph is identified, as described with respect to controller compositions 320, 330 in FIG. 3. At operation 540, the compositions of candidate modules obtained at operation 535, are output as evolved controllers, as described with respect to FIG. 4.

At operation 545, the evolved controllers are subjected to an online experimentation to determine whether the existing controller is replaceable by any of the plurality of evolved controllers, as described with respect to FIG. 4. For example, an online experimentation comprises a sanity check at operation 550, a simulation at operation 555, and a network trial at operation 560. In at least one embodiment, if any of these sanity check, simulation or network trial fails, the evolved controller is determined not suitable to replace the existing controller. If the online experimentation indicates that the evolved controller is suitable to replace the existing controller, the EC that performs the controller evolution is configured to implement this replacement, and/or make the evolved controller available for other ECs in the autonomous network.

Examples of an autonomous network in accordance with some embodiments, in the context of CDNs are now described. Content delivery networks (CDNs) geographically distribute content and services to improve latency, throughput, availability, and resilience for the customers and end users. Originally focused on improving download and streaming performance through caching, CDNs nowadays provide many additional services such as mobile content acceleration, content transcoding, Distributed Denial of Service (DDOS) attack protection, web application firewalls. Through the addition of compute functionality, CDNs are on the way to transforming into mobile edge computation providers. CDNs naturally have to over-provision services to ensure high availability in case of failures (resiliency) and to cope with spikes in demand. In some situations, just providing the content in multiple places, however, does not necessarily ensure that the load will be spread evenly, or better even, optimally, between the different locations. Several considerations for optimizing performance by a CDN include: traffic load balancing, computer load balancing, and content placement. Each of these aspects are improvable by an autonomous network in accordance with one or more embodiments.

FIG. 6 is a schematic block diagram of a traffic load balancing section 600 of an autonomous network for CDNs, in accordance with some embodiments.

Clients historically access content and services by means of transport-layer routing to the one server hosting the desting IP address. When the same content is to be provided in multiple places, this approach on its own is no longer sufficient. Since user demand is dynamic, and in some cases, even erratic, a static allocation would inherently be suboptimal. To address this concern, some embodiments provide a dynamic DNS based approach, where the approximate latency from each IP range to each serving location is known, and where each point of presence (POP) is allocated its own IP range.

In the example configuration in FIG. 6, the traffic load balancing section 600 of the autonomous network comprises a Global OC in the form of a controller 610 (also referred to herein as "Global OC 610"), which is configured to distribute weights for each of PoPs 620, 630, 640 (e.g., content servers for respective Areas 1-3) and service (A-D) to a distributed, any casted DNS server 650. The controller 610 comprises a configuration corresponding to the controller 100. The DNS server 650 corresponds to a controlled element, or hardware equipment, under control of the controller 610. The weights for each of PoPs 620, 630, 640 are distributed to the DNS server 650 via updates 660. The DNS server 650 in turn reports, via telemetry 670, how many responses for each (service, PoP)-pair the DNS server 650 has sent out during the last time cycle. Likewise, the PoPs 620, 630, 640 report, via telemetry 680, ingress and egress link loads and service utilization and capacities to the controller 610. Furthermore, the controller 610 has information about the priority, e.g., importance or utility, of each service A-D, as well as its latency and bandwidth requirements. A client 601 sends an inquiry for contents (one or more of services A-D) to the DNS server 650 via a link 605. Based on the service requested by the client and the weights for each of PoPs 620, 630, 640 as provided by the controller 610, the DNS server 650 redirects the client 601 to one or more appropriate PoP(s) 620, 630, 640. As redirected by the DNS server 650, the client 601 accesses one or more of the Pops 620, 630, 640 via one or more respective links 602, 603, 604 to receive the requested service.

An example of the requirements the Global OC 610 is configured to fulfil is detailed in Table 1. Based on these requirements, modules are specified in Table 2 from which the Global OC 610 is to be composed. For each module in Table 2, a corresponding description in the specification language of its capabilities and interface is provided. An example set of module compositions for the sense phase of the Global OC 610 is shown in FIG. 7A. The listed modules are not all uniquely associated with the task of traffic load balancing. Each of the sensing modules is also usable for a CDN health monitoring controller. Hence, module reuse is an advantage in at least one embodiment.

TABLE 1

Example requirements (outputs) of controller components (phases) of Global OC 610.

| Phase | Outputs |
| --- | --- |
| Sensing | number of incoming requests per IP range, per service location, capacity and load of services aggregation of results over a specified time period measured latency between IP ranges and CDN locations any additional data useful for predicting future user demand |
| Analysis | updated latency based on measurement samples estimated latency for unknown IP ranges short-term predicted traffic based on incoming DNS requests longer-term predicted traffic |
| Decision | assignments (weights) per service, per location |
| Action | assignments propagation to DNS servers |

TABLE 2

Example modules per controller component (phase).

| Phase | Modules |
| --- | --- |
| Sensing | HTTP server request metric Service deployment database time series database HTTP server request timing metric; RTT probe news, twitter scraping, etc. |
| Analysis | Latency estimator using mean latency over fixed period, sample length as parameter BGP announcement based IP hole mitigator DNS request based short-term traffic predictor history-based long-term traffic predictor |
| Decision | weight calculation heuristic employing a linear optimization solver |
| Action | DNS configurator |

Using this information, the traffic load balancing section 600 has the basic inputs to create and deploy controllers for the CDN traffic load balancing task. By using the analysis and sensing components, it is possible for the controller 610 to understand how its actions (i.e., the weight assignments) impact the operation of the service for the current environmental state. Accordingly, it is possible for the decision component of the controller 610 to decide how to change the weights to be propagated to the DNS server 650 by the action component of the controller 610.

The utility function provides a comprehensible measure of how well the overall weight assignments matched the current conditions of the network. An example utility function is $$\Sigma u(l(r),t(r),s(r)) r \in R$$

where R is the set of all requests, l(r) is the latency measured for request r, t(R) is the measured throughput, s(r) is the service the request was destined for, u is an administrator-defined function which calculates the utility of each request based on the service value, the measured latency, and the measured throughput. For simplicity, it is assumed that the cost of handling each request is identical, independent of the utilized bandwidth and location. The goal of the operation controller is to maximize the general utility function.

To design and re-design (evolve) the Global OC 610, an EC is provided. The EC is not only configured to ensure that the Global OC 610 is achieving its goal of efficiently load balancing the traffic, but also to come up with new/evolved OCs based on the available modules, which might outperform the existing Global OC 610. Current and historical data from the network as well as the classification of the environment, the current blueprint of the Global OC 610, and a definition of the utility of the Global OC 610 are used by the EC. As the historical data implies, the EC makes decisions over a time period in this example. A list of example EC modules is shown in Table 3. This list is not exhaustive.

Table 3: Modules of EC for Traffic Load Balancing

TABLE 3

Modules of EC For Traffic Load Balancing

| Phase | Modules |
| --- | --- |
| Sensing | general utility for each time cycle during which the current EC was active situational characteristics at each time cycle |
| Analysis | classification of situation for each time cycle relative (as the achievable optimum is unknown) utility of EC for each encountered situation |
| Decision | decide whether to come up with a new OC, which modules the new OC should have, and how the modules should be configured using appropriate optimizationte chniques |
| Action | evolve new controller request controller experimentation update knowledge base with experimental results |

If the Global OC 610 is deemed insufficiently effective at its task for a giving situation, as determined by the measured or estimate utility function, the EC is configured to decide to replace it with another existing or new OC. If the situation changes and a different controller has shown to outperform the current one under the new conditions, the EC is configured to replace the OC again. If no sufficiently performant OC is known, the EC is configured to generate a new controller composition.

A trial and error experimentation is next performed for checking whether newly evolved controllers actually do a better job at load balancing the traffic under the current conditions than other, existing controllers. "Better" is defined as delivering a higher utility function value when measured using the same utility function as the current controllers. First, a sanity check was performed to ensure that the new controller is complete. A sanity check is to ensure that all actions the controller may request to take are confined to the domain of load balancing and that actions are not being taken in other domains. Another check is to ensure that the new controller make progress, also known as not dead-locking. Second, it is verified through a simulation that the new controller operates as expected. For example, the new controller is instantiated in a sandbox environment, is fed recorded sensor data, and it is estimated how the weight changes the new controller generates would impact the actual load-balancing, using the request log for the time period during which the new weights would have been applied, and the utility function value of these changes is calculated. It is further verified that sudden dramatic changes which would shift a lot of traffic from one location to another and oscillations in assignments are infrequent or non-existing. Third, the new controller is gradually deployed in the network, starting with low impact regions or for relatively unimportant services, and for a limited period of time. If the performance is poor, it is rolled back before the allocated trial time is over. Otherwise, the trial is extended to more important areas and services. The above stages are fully automated by an EC and/or experimentation manager.

FIGS. 7A-7D are schematic block diagrams of first-fourth compositions 710A-710D of a sensing component, in accordance with some embodiments. In at least one embodiment, the sensing component corresponds to the sensing component of the controller 610 described with respect to FIG. 6.

In FIG. 7A, the first composition 710A of the sensing component includes four source modules 711, 712, 713, 714 corresponding to the modules for the sense phase listed in Table 2, an aggregation module 715, and a sink module, i.e., report module 716. The source modules 711, 712, 713, 714 are configured to receive sensor data from various sources, e.g., telemetry 670, 680 in FIG. 6. The aggregation module 715 is configured to aggregate various sensor data for the report module 716. The report module 716, which is a sink module, is connected to a source module 721 of the next phase, i.e., an analyzing component 720, to provide the aggregated sensor data to the analyzing component 720. The report module 716 is further configured to exchange data with the knowledge base 190.

FIGS. 7B-7D show second-fourth compositions 710B-710D of the sensing component in an evolved or new controller being developed by an EC based on the first composition 710A. For simplicity, the analyzing component 720 and the knowledge base 190 are not illustrated in FIGS. 7B-7D.

In FIG. 7B, the second composition 710B of the sensing component includes the same modules as in FIG. 7A; however, with a different interconnection. Specifically, two source modules 711, 712 remain connected to the aggregation module 715, whereas the other two source modules 713, 714 are now directly connected to the report module 716.

In FIG. 7C, the third composition 710C of the sensing component includes most of the modules as in FIG. 7A, except for the aggregation module 715. Without the aggregation module 715, all source modules 711, 712, 713, 714 are directly connected to the report module 716.

In FIGS. 7A to 7D, the fourth composition 710D of the sensing component is similar to the second composition 710B in FIG. 7B, except that two source modules 711, 714 are omitted. The compositions 710A-710D are examples, and other compositions are within the scopes of various embodiments. In at least one embodiment, the sensing component is evolved from one composition to another among the compositions 710A-710D depending on, e.g., the decision phase of the EC responsible for evolving or controlling the controller having the sensing component.

In some embodiments, the concept of the cognitive loop makes it possible to allow interaction and collaboration between multiple independently designed control and optimization tasks. The controller hierarchy allows these tasks to be unified in a holistic manner, where higher-level cognitive loops supervise, control and evolve their subordinates. Evolution is realized by means of at least one of appropriate cognition, learning and optimization strategies. This online evolution becomes possible with functional composition and experimental evaluation. Functional composition allows some embodiments to use small functional building blocks (modules) to compose and configure new and unique controllers on its own. These controllers are not limited to controlling and improving the operation of network infrastructure, but will also modify and improve the very architecture and functionality of the controlling systems themselves at runtime. It further enables some embodiments to seamlessly integrate new technologies and research output as they become available. Experimental evolution enables some embodiments to test and validate the performance of these autonomously evolved controllers in practice, within the actual network. The combination of one or more or all these technologies enables some embodiments to realize truly autonomous control and optimization in an emergent manner.

FIG. 8 is a block diagram of an example computer hardware 800, in accordance with some embodiments. The computer hardware 800 is configurable to operate as one or more controllers and/or experimentation manager described herein. The computer hardware 800 comprises at least one hardware processor 802, and at least one non-transitory, computer-readable storage medium, or memory, 804. In at least one embodiment, the computer hardware 800 further comprises one or more of a bus 808, an input/output (I/O) interface 810, a network interface circuitry 812.

The processor 802 is configured to execute computer program codes, such as composable and replaceable modules, in the storage medium 804 in order to cause the computer hardware 800 to perform a portion or all of the described processes and/or methods. In one or more embodiments, the processor 802 comprises a central processing unit (CPU), a multi-processor, a distributed processing system, an application specific integrated circuit (ASIC), and/or a suitable processing unit.

The storage medium 804, amongst other things, is encoded with, i.e., stores, computer program codes, i.e., composable and replaceable modules 806, to be executed by the processor 802. In one or more embodiments, the storage medium 804 comprises an electronic, magnetic, optical, electromagnetic, infrared, and/or a semiconductor system (or apparatus or device). For example, the storage medium 804 includes a semiconductor or solid-state memory, a magnetic tape, a removable computer diskette, a random access memory (RAM), a read-only memory (ROM), a rigid magnetic disk, and/or an optical disk. In one or more embodiments using optical disks, the storage medium 804 includes a compact disk-read only memory (CD-ROM), a compact disk-read/write (CD-R/W), and/or a digital video disc (DVD).

The I/O interface 810 includes an input device, an output device and/or a combined input/output device for enabling a user and/or external circuitry/equipment to interact with computer hardware 800. An input device comprises, for example, a keyboard, keypad, mouse, trackball, trackpad, touchscreen, and/or cursor direction keys for communicating information and commands to the processor 802. An output device comprises, for example, a display, a printer, a voice synthesizer, etc. for communicating information to a user.

The network interface circuitry 812 is coupled to a network 814 so that the processor 802 and storage medium 804 are capable of connecting to other equipment via the network 810. The network interface circuitry 804 includes wireless network interfaces such as BLUETOOTH, WIFI, WIMAX, or wired network interfaces such as ETHERNET, USB, or IEEE-1364.

In some embodiments, a portion or all of the described processes and/or methods is implemented as a standalone software application for execution by a processor. In some embodiments, a portion or all of the described processes and/or methods is implemented as a software application that is a part of an additional software application. In some embodiments, a portion or all of the described processes and/or methods is implemented as a plug-in to a software application.

The described methods and algorithms include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

In some embodiments, a controller for an autonomous network comprises at least one memory containing a plurality of composable and replaceable modules, and at least one processor coupled to the at least one memory and configured to execute the plurality of modules in an interconnected manner to configure controller components. The controller components comprise a sensing component configured to collect sensor data about at least one controlled element under control of the controller, an analyzing component configured to process the collected sensor data to derive a current state of the at least one controlled element, a deciding component configured to, based on the derived current state, decide an action to be made with respect to the at least one controlled element, and an acting component configured to carry out the decided action with respect to the at least one controlled element, by causing a change in at least one of an operation of the at least one controlled element, or a configuration of the at least one controlled element.

In some embodiments, an autonomous network comprises a plurality of controllers interconnected into a system hierarchy graph. Each of the plurality of controllers comprises at least one memory containing a plurality of composable and replaceable modules, and at least one processor coupled to the at least one memory and configured to execute the plurality of modules in an interconnected manner in accordance with a controller graph to, based on sensor data about at least one controlled element under control of said each controller, carry out an action with respect to the at least one controlled element. The plurality of controllers comprises at least one operation controller (OC) configured to carry out the action by causing a change in an operation of the at least one controlled element, and at least one evolution controller (EC) configured to carry out the action by causing a change in a configuration of the at least one controlled element.

A method of operating an autonomous network is provided in accordance with some embodiments. The network comprises a plurality of controllers interconnected into a system hierarchy graph. Each of the plurality of controllers being an operation controller (OC) or an evolution controller (EC) and comprises at least one memory containing a plurality of composable and replaceable modules, and at least one processor coupled to the at least one memory and configured to execute the plurality of modules in an interconnected manner. The method comprises controlling, by an OC, hardware equipment or another OC below in the system hierarchy graph; controlling and evolving, by an EC, an existing controller below in the system hierarchy graph. The evolving comprises identifying a number of composable and replaceable candidate modules which are composable to complete a section of a controller graph of said existing controller, determining a plurality of different compositions in each of which various candidate modules are interconnected to complete the section of the controller graph, and outputting a plurality of evolved controllers each corresponding to one of the plurality of compositions. The method further comprises performing, by an experimentation manager, an online experimentation to determine whether said existing controller is replaceable by any of the plurality of evolved controllers.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A controller for an autonomous network, the controller comprising:
at least one memory containing a plurality of composable and replaceable modules; and
at least one processor coupled to the at least one memory and configured to execute the plurality of modules in an interconnected manner to configure controller components,
the controller components comprising:
a sensing component configured to collect sensor data about at least one controlled element under control of the controller;
an analyzing component configured to process the collected sensor data to derive a current state of the at least one controlled element;
a deciding component configured to, based on the derived current state, decide an action to be made with respect to the at least one controlled element; and
an acting component configured to carry out the decided action with respect to the at least one controlled element, by causing a change in at least one of:
an operation of the at least one controlled element, or
a configuration of the at least one controlled element,
wherein each of the controller components comprises interconnected modules among the plurality of modules, and
the interconnected modules of each of the controller components comprise at least a source module and a sink module connected either directly or indirectly to the source module, and
the source module of one of the controller components is connected to the sink module of another of the controller components.

2. The controller of claim 1, wherein
each of the plurality of modules comprises an application programming interface (API), the API comprising:
a unique identification (ID) uniquely identifying said module among the plurality of modules, and
dependencies defining at least an input and an output of said module, and
two modules among the plurality of modules are connectable when a dependency defining an input in the API of one module matches a dependency defining an output in the API of the other module.

3. The controller of claim 2, wherein
each of the plurality of modules further comprises at least one of:
codes executable by the at least one processor to perform a logical operation of the module,
parameters to be used by the at least one processor to initialize and configure the logical operation, or
meta information including descriptions of at least one of the API, the input, or the output of the module.

4. The controller of claim 1, wherein
the at least one processor is configured to, in response to an instruction corresponding to an action decided and carried out by another controller, perform at least one of:
  replacing one of the interconnected modules with another composable and replaceable module, or
  changing a connection among the interconnected modules.

5. The controller of claim 1, wherein
the at least one memory further contains a knowledge base accessible by at least one of the controller components, and containing previous choices and corresponding consequences.

6. The controller of claim 1, wherein
the controller components are configured to together perform a cognitive control loop to optimize at least one of:
  the operation of the at least one controlled element, or
  the configuration of the at least one controlled element.

7. An autonomous network, comprising:
a plurality of controllers interconnected into a system hierarchy graph, each of the plurality of controllers comprising:
  at least one memory containing a plurality of composable and replaceable modules, and
  at least one processor coupled to the at least one memory and configured to execute the plurality of modules in an interconnected manner in accordance with a controller graph to, based on sensor data about at least one controlled element under control of said each controller, carry out an action with respect to the at least one controlled element,
wherein
the plurality of controllers comprises
  at least one operation controller (OC) configured to carry out the action by causing a change in an operation of the at least one controlled element, and
  at least one evolution controller (EC) configured to carry out the action by causing a change in a configuration of the at least one controlled element and
the at least one controlled element under control of the at least one OC comprises at least one of:
another OC under the at least one OC in the system hierarchy graph, or hardware equipment,
the at least one controlled element under control of the at least one EC comprises at least one of:
another controller under the at least one EC in the system hierarchy graph, or hardware equipment.

8. The network of claim 7, wherein
the at least one controlled element under control of the at least one EC comprises another controller under the at least one EC in the system hierarchy graph, and
the at least one EC is configured to carry out the action with respect to said another controller, by performing at least one of:
  controller evolution of said another controller, or
  hierarchy evolution of a subgraph under the at least one EC in the system hierarchy graph.

9. The network of claim 8, wherein
the controller evolution comprises at least one of:
  replacing one of the interconnected modules in said another controller with a different instance of the same one module, or with a different composable and replaceable module, or
  changing the controller graph of said another controller.

10. The network of claim 9, wherein
the hierarchy evolution comprises at least one of:
  causing said another controller to be replaced with a different controller, or
  causing a change in the subgraph under the at least one EC.

11. The network of claim 7, wherein, for each controller among the plurality of controllers,
each of the plurality of composable and replaceable modules interconnected in said each controller comprises an application programming interface (API), the API comprising:
  a unique identification (ID) uniquely identifying said module among the plurality of modules, and
  dependencies defining at least an input and an output of said module, and
two modules among the plurality of modules are connectable when a dependency defining an input in the API of a module matches a dependency defining an output in the API of another module.

12. The network of claim 11, wherein
the EC is configured to control one or more further controllers in a subgraph under the EC in the system hierarchy graph,
the EC comprises at least one special dependency exposed via the API of a source module of the EC, and
the EC is configured to define the at least one special dependency to indicate at least one of:
  a number and types of said one or more further controllers,
  whether to perform controller evolution of said one or more further controllers, or
  whether to perform hierarchy evolution of the subgraph under the EC.

13. The network of claim 7, wherein
the at least one processor of each controller among the plurality of controllers is configured to execute the plurality of interconnected modules to perform a cognitive control loop to optimize at least one of:
  the operation of the at least one controlled element, or
  the configuration of the at least one controlled element.

14. A method of operating an autonomous network,
the network comprising a plurality of controllers interconnected into a system hierarchy graph, each of the plurality of controllers being an operation controller (OC) or an evolution controller (EC) and comprising:
  at least one memory containing a plurality of composable and replaceable modules, and
  at least one processor coupled to the at least one memory and configured to execute the plurality of modules in an interconnected manner,
the method comprising:
  controlling, by an OC, hardware equipment or another OC below in the system hierarchy graph;
  controlling and evolving, by an EC, an existing controller below in the system hierarchy graph, wherein said evolving comprises:
    identifying a number of composable and replaceable candidate modules which are composable to complete a section of a controller graph,
    determining a plurality of different compositions in each of which various candidate modules are interconnected to complete the section of the controller graph, and
    outputting a plurality of evolved controllers each corresponding to one of the plurality of compositions; and performing, by an experimentation manager, an online experimentation to determine whether said existing controller is replaceable by any of the plurality of evolved controllers.

15. The method of claim 14, wherein
for each of the plurality of evolved controllers, said online experimentation comprises at least one of:
   a sanity check to determine whether the evolved controller includes a logical mistake or not,
   a simulation to estimate a utility of the evolved controller by using a utility function, or
   a network trial in which the experimentation manager initially limits at least one of a physical scope or a temporal scope of the evolved controller, and gradually increases said at least one of the physical scope or the temporal scope based on the measured or estimated utility of the evolved controller.

16. The method of claim 14, further comprising:
coordinating, by the experimentation manager, multiple online experimentations initiated by multiple ECs evolving other controllers in the network, said coordinating comprises at least one of resource allocation, or scheduling.

17. The method of claim 14, wherein
each of the composable and replaceable candidate modules comprises an application programming interface (API), the API comprising:
   a unique identification (ID) uniquely identifying said candidate module, and
   dependencies defining at least an input and an output of said candidate module, and
each of the plurality of compositions for completing the section of the controller graph is determined by interconnecting candidate modules when a dependency defining an input in the API of a candidate module matches a dependency defining an output in the API of another candidate module.

* * * * *